(12) United States Patent
Nakazawa et al.

(10) Patent No.: US 8,709,220 B2
(45) Date of Patent: Apr. 29, 2014

(54) WATER ELECTROLYSIS APPARATUS

(75) Inventors: Koji Nakazawa, Utsunomiya (JP); Masanori Okabe, Nerima-ku (JP); Eiji Haryu, Utsunomiya (JP); Kenji Taruya, Utsunomiya (JP); Koichi Takahashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 637 days.

(21) Appl. No.: 13/025,815

(22) Filed: Feb. 11, 2011

(65) Prior Publication Data

US 2011/0198217 A1 Aug. 18, 2011

(30) Foreign Application Priority Data

Feb. 12, 2010 (JP) ................................. 2010-029146

(51) Int. Cl.
*C25B 9/18* (2006.01)
*C25B 9/00* (2006.01)
*C25B 1/12* (2006.01)

(52) U.S. Cl.
USPC ........................... 204/258; 204/252; 204/270

(58) Field of Classification Search
USPC ....................................................... 204/258
See application file for complete search history.

(56) References Cited

U.S. PATENT DOCUMENTS

2006/0254907 A1* 11/2006 Taruya et al. ................. 204/266

FOREIGN PATENT DOCUMENTS

| JP | 2004-2914 | 1/2004 |
| JP | 2004-115860 | 4/2004 |
| JP | 2004115860 A * | 4/2004 |

* cited by examiner

*Primary Examiner* — Bryan D. Ripa
(74) *Attorney, Agent, or Firm* — Nelson Mullins Riley & Scarborough LLP; Anthony A. Laurentano

(57) ABSTRACT

Each unit cell of a water electrolysis apparatus includes a pair of an anode separator and a cathode separator and a membrane electrode assembly interposed between the pair of separators. The anode separator has a first flow field to which water is supplied, and the cathode separator has a second flow field for producing high-pressure hydrogen through electrolysis of the water. A second seal groove for receiving a second seal member is disposed annularly around the second flow field. A pressure-releasing chamber is disposed outwardly of the second seal groove, is capable of communicating with the second seal groove and communicates with the outside through a depressurizing channel.

14 Claims, 13 Drawing Sheets

WATER ELECTROLYSIS APPARATUS

CROSS-REFERENCE TO RELATED APPLICATION

This application is based upon and claims the benefit of priority from Japanese Patent Application No. 2010-029146 filed on Feb. 12, 2010, of which the contents are incorporated herein by reference.

BACKGROUND OF THE INVENTION

1. Field of the Invention

The present invention relates to a water electrolysis apparatus for producing hydrogen through electrolysis of water, the apparatus including an electrolyte membrane, first and second current collectors disposed on the respective opposite sides of the electrolyte membrane, first and second separators stacked on the current collectors, a first flow field defined by stacking the first current collector and the first separator, and a second flow field defined by stacking the second current collector and the second separator.

2. Description of the Related Art

Solid polymer electrolyte fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

Generally, water electrolysis apparatus are used to generate a hydrogen gas for use as a fuel gas for such solid polymer electrolyte fuel cells. The water electrolysis apparatus employ a solid polymer electrolyte membrane (ion exchange membrane) for decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Such a water electrolysis apparatus generates hydrogen under a high pressure of several tens MPa. There is known a hydrogen supply apparatus as disclosed in Japanese Laid-Open Patent Publication No. 2004-002914, for example. As shown in FIG. 13 of the accompanying drawings, the disclosed hydrogen supply apparatus includes a number of unit cells each comprising an assembly which has an anode current collector 2, a cathode current collector 3, and an electrode assembly membrane 1 disposed between the collectors 2 and 3, and a pair of bipolar plates 4 sandwiching the assembly therebetween.

A flow field 5a for supplying water therethrough is defined between one of the bipolar plates 4 and the anode current collector 2, and a flow field 5b for passing generated hydrogen therethrough is defined between the other bipolar plate 4 and the cathode current collector 3. Each of the bipolar plates 4 has first seal grooves 7a, 7b defined in a peripheral edge portion thereof and accommodating first o-rings 6a respectively therein and second seal grooves 7c, 7d defined in a peripheral edge portion thereof and accommodating second o-rings 6b respectively therein.

In the above Japanese Laid-Open Patent Publication No. 2004-002914, the flow field 5b serves as a high-pressure hydrogen generating chamber for generating high-pressure hydrogen. The second seal groove 7d, which is held in fluid communication with the flow field 5b, is filled with the high-pressure hydrogen, developing a high pressure therein. As a result, the hydrogen slightly leaks through the second o-rings 6b, and then stagnates between the second seal groove 7d and the first seal groove 7b.

Thus, the stagnating high-pressure hydrogen causes reaction force between the second seal groove 7d and the first seal groove 7b, and the reaction force tends to disrupt a balance of pressing forces externally-applied to the entire hydrogen supply apparatus in the stacking direction. Consequently, the electrode assembly membrane 1 can not be maintained in an appropriate pressed condition, and then the electrolysis voltage increases, resulting in decrease of the electrolysis performance.

SUMMARY OF THE INVENTION

It is an object of the present invention to provide a water electrolysis apparatus which is capable of suitably discharging, to the outside, gas that has leaked from a seal member, and stably applying a desired pressing force to an electrolyte membrane.

The present invention relates to a water electrolysis apparatus for producing hydrogen through electrolysis of water, the apparatus comprising an electrolyte membrane, first and second current collectors disposed respectively on opposite sides of the electrolyte membrane, first and second separators stacked respectively on the current collectors, a first flow field defined by stacking the first current collector and the first separator, and a second flow field defined by stacking the second current collector and the second separator.

In an aspect of the present invention, at least the first separator or the second separator has a seal groove annularly extending around the first current collector or the second current collector, a seal member being disposed in the seal groove, and a pressure-releasing chamber is disposed outwardly of the seal groove, is capable of communicating with the seal groove, and communicates with an outside through a depressurizing channel.

In another aspect of the present invention, the water electrolysis apparatus further has a passage communicating with at least the first flow field or the second flow field and which extends in a stacking direction of the first and second separators, wherein at least the first separator or the second separator has a seal groove annularly extending around the passage, a seal member being disposed in the seal groove, and a pressure-releasing chamber is disposed outwardly of the seal groove, is capable of communicating with the seal groove, and communicates with an outside through a depressurizing channel.

According to the present invention, when gas that has flowed into the seal groove leaks from the seal member, the gas flows into the pressure-releasing chamber communicable with the exterior of the seal groove, and is thereafter discharged to the outside through the depressurizing channel.

Thus, gas that has leaked from the seal member can be reliably prevented from stagnating in the apparatus, and a desired pressing force can be stably applied to the electrolyte membrane. Therefore, electrolysis voltage can be prevented from increasing, and a desired electrolysis performance can be suitably maintained for a long period of time.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
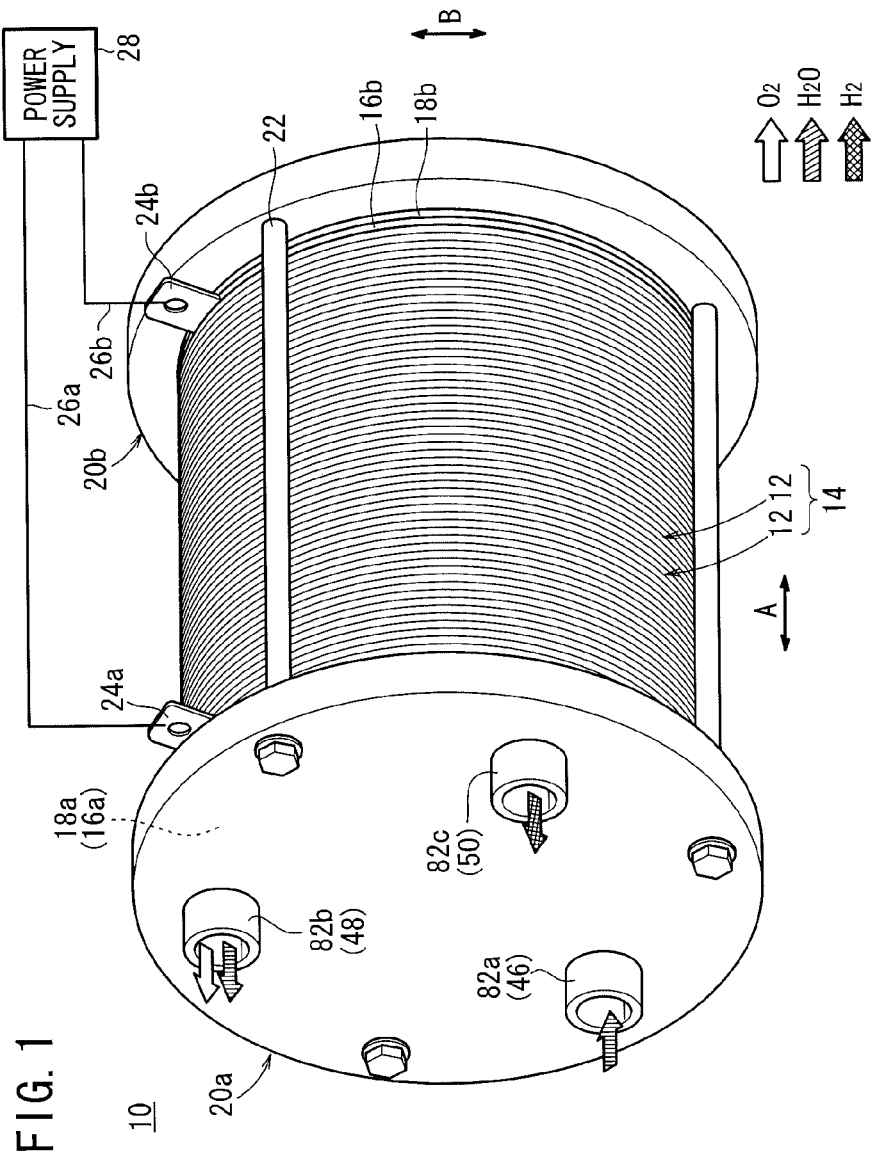
FIG. 1 is a perspective view of a water electrolysis apparatus according to a first embodiment of the present invention.
Figure 2:
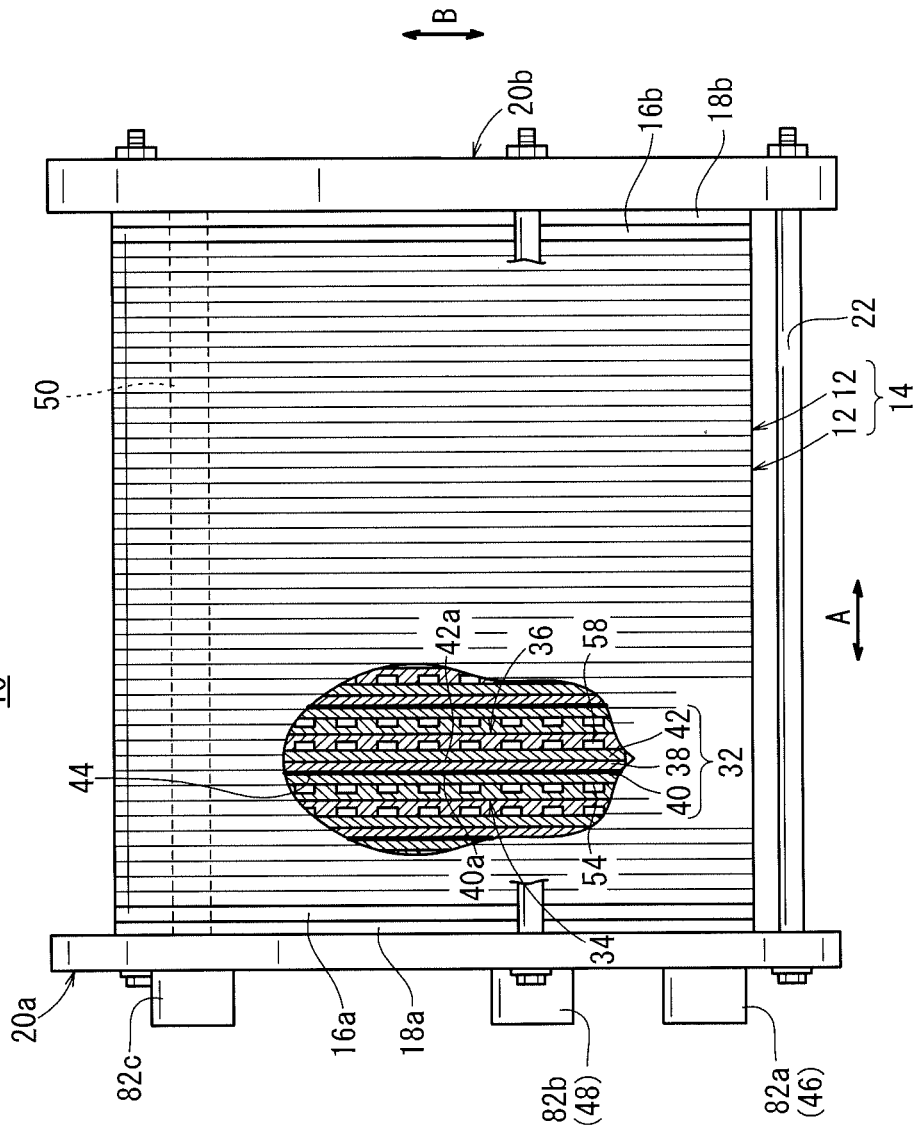
FIG. 2 is a side elevational view, partly in cross section, of the water electrolysis apparatus shown in FIG. 1.

As shown in FIGS. 1 and 2, a water electrolysis apparatus 10 according to a first embodiment of the present invention serves as a high-pressure hydrogen manufacturing apparatus, and includes a stack assembly 14 comprising a plurality of unit cells 12 stacked in a horizontal direction indicated by the arrow A. The unit cells 12 may be stacked in a vertical direction indicated by the arrow B. The water electrolysis apparatus 10 also includes a terminal plate 16a, an insulating plate 18a, and an end plate 20a which are mounted on an end of the stack assembly 14 in the order named, and a terminal plate 16b, an insulating plate 18b, and an end plate 20b which are mounted on the other end of the stack assembly 14 in the order named. The unit cells 12, the terminal plates 16a, 16b, the insulating plates 18a, 18b, and the end plates 20a, 20b are of a disk shape.

The stack assembly 14, the terminal plates 16a, 16b, and the insulating plates 18a, 18b are fastened integrally together by the end plates 20a, 20b that are interconnected by a plurality of tie rods 22 extending in the directions indicated by the arrow A between the end plates 20a, 20b. Alternatively, the stack assembly 14, the terminal plates 16a, 16b, and the insulating plates 18a, 18b may be integrally held together in a box-like casing, not shown, which includes the end plates 20a, 20b as end walls. The water electrolysis apparatus 10 is illustrated as being of a substantially cylindrical shape. However, the electrolysis apparatus 10 may be of any of various other shapes such as a cubic shape.

As shown in FIG. 1, terminals 24a, 24b project radially outwardly from respective side edges of the terminal plates 16a, 16b. The terminals 24a, 24b are electrically connected to a power supply 28 by electric wires 26a, 26b, respectively. The terminal 24a, which is an anode terminal, is connected to the positive terminal of the power supply 28, and the terminal 24b, which is a cathode terminal, is connected to the negative terminal of the power supply 28.

Figure 3:
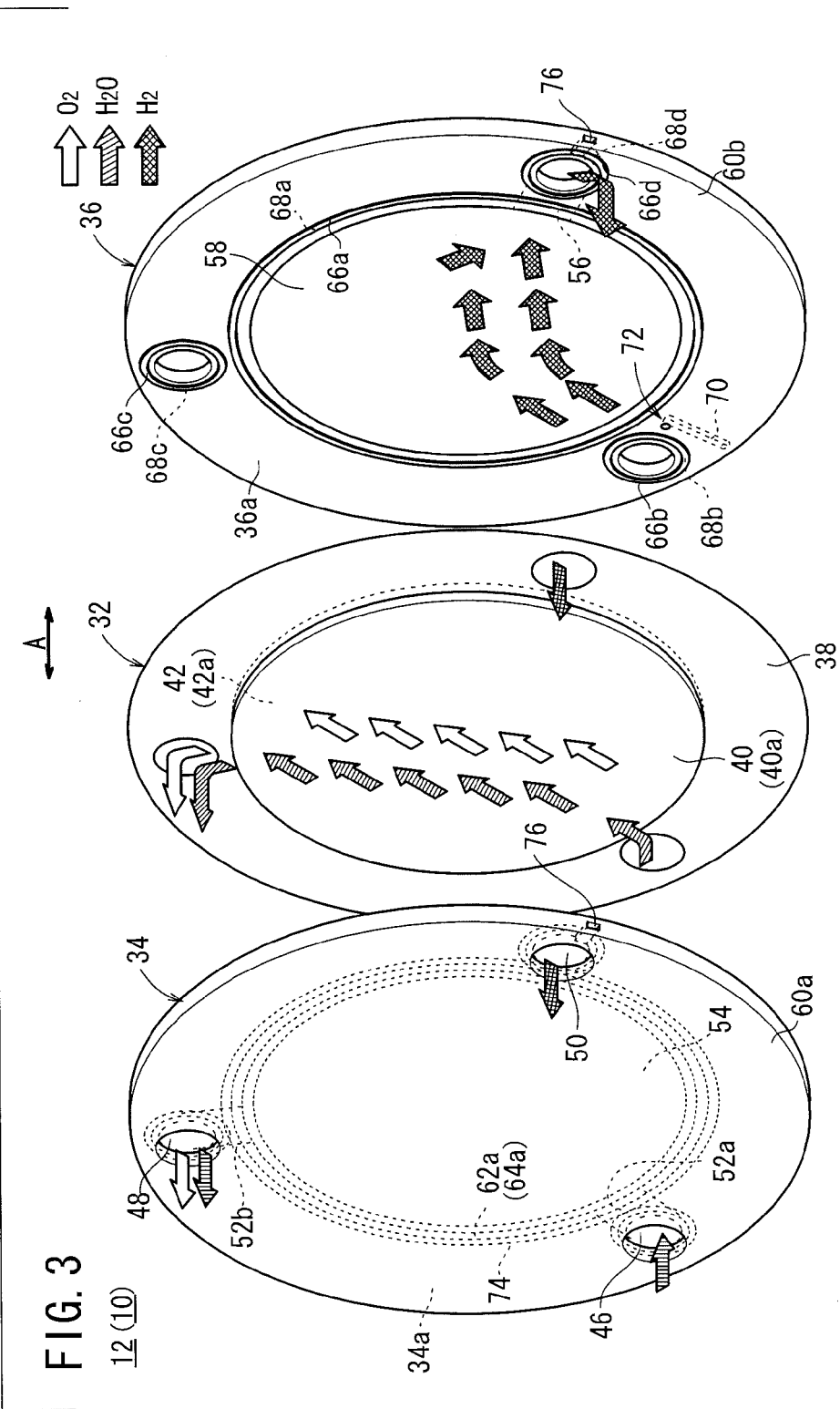
FIG. 3 is an exploded perspective view of a unit cell of the water electrolysis apparatus.
Figure 4:
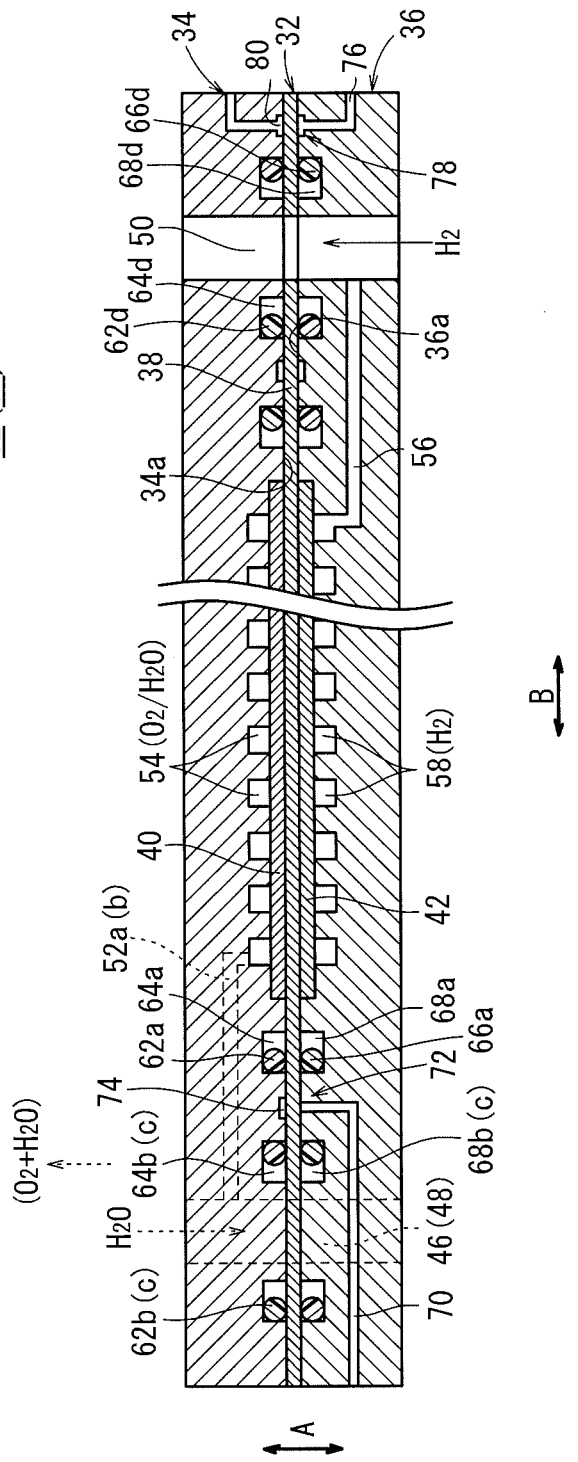
FIG. 4 is a fragmentary cross-sectional view of the unit cell shown in FIG. 3.

As shown in FIGS. 3 and 4, each of the unit cells 12 comprises a disk-shaped membrane electrode assembly 32, and an anode separator (first separator) 34 and a cathode separator (second separator) 36 which sandwich the membrane electrode assembly 32 therebetween. Each of the anode separator 34 and the cathode separator 36 is of a disk shape and is in the form of a carbon plate, or in the form of a metal plate such as a steel plate, a stainless steel plate, a titanium plate, an aluminum plate, or a plated steel plate. Alternatively, each of the separators 34, 36 is formed by performing anti-corrosion treatment on the surface of such a metal plate and thereafter pressing the metal plate into shape, or by cutting the metal plate into shape and thereafter performing anti-corrosion treatment on the surface of the cut metal plate.

The membrane electrode assembly 32 has a solid polymer electrolyte membrane 38 comprising a thin membrane of perfluorosulfonic acid which is impregnated with water, and an anode current collector (first current collector) 40 and a cathode current collector (second current collector) 42 which are disposed respectively on the opposite surfaces of the solid polymer electrolyte membrane 38.

An anode catalyst layer 40a and a cathode catalyst layer 42a are formed on the opposite surfaces of the solid polymer electrolyte membrane 38, respectively. The anode catalyst layer 40a is made of a Ru (ruthenium)-based catalyst, for example, and the cathode catalyst layer 42a is made of a platinum catalyst, for example.

Each of the anode current collector 40 and the cathode current collector 42 is made of a sintered spherical atomized titanium powder (porous electrically conductive material), and has a smooth surface area which is etched after it is cut to shape. Each of the anode current collector 40 and the cathode current collector 42 has a porosity in the range of 10% through 50%, or more preferably in the range from 20% through 40%.

Each of the unit cells 12 has, in an outer circumferential edge portion thereof, a water supply passage 46 for supplying water (pure water), a discharge passage 48 for discharging oxygen generated by a reaction in the unit cells 12 and used water, and a hydrogen passage 50 for passing therethrough hydrogen (having high pressure) generated by the reaction. The water supply passages 46 defined in the respective unit cells 12 communicate with each other in the stacking directions indicated by the arrow A. The discharge passages 48 defined in the respective unit cells 12 communicate with each other in the stacking directions indicated by the arrow A. The hydrogen passages 50 defined in the respective unit cells 12 communicate with each other in the stacking directions indicated by the arrow A.

As shown in FIGS. 3 and 4, the anode separator 34 has a supply channel 52a defined in an outer circumferential edge portion thereof in fluid communication with the water supply passage 46 and a discharge channel 52b defined in an outer circumferential edge portion thereof in fluid communication with the discharge passage 48. The anode separator 34 also has a first flow field 54 defined in a surface 34a thereof which faces the membrane electrode assembly 32 and held in fluid communication with the supply channel 52a and the discharge channel 52b. The first flow field 54 extends within a range corresponding to the surface area of the anode current collector 40, and comprises a plurality of fluid passage grooves, a plurality of embossed ridges, or the like (see FIGS. 2 and 4).

The cathode separator 36 has a discharge channel 56 defined in an outer circumferential edge portion thereof in fluid communication with the hydrogen passage 50. The cathode separator 36 also has a second flow field 58 defined in a surface 36a thereof that faces the membrane electrode assembly 32 and held in fluid communication with the discharge channel 56. The second flow field 58 extends within a range corresponding to the surface area of the cathode current collector 42, and comprises a plurality of flow field grooves, a plurality of embossed ridges, or the like (see FIGS. 2 and 4).

Seal members 60a, 60b are integrally combined with respective outer circumferential edge portions of the anode separator 34 and the cathode separator 36. The seal members 60a, 60b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like.

As shown in FIG. 4, the surface 34a of the anode separator 34 which faces the membrane electrode assembly 32 has a first seal groove 64a defined therein which extends annularly around the first flow field 54 and the anode current collector 40. A first seal member 62a is disposed in the first seal groove 64a. The surface 34a of the anode separator 34 also has first seal grooves 64b, 64c, 64d defined therein which extend annularly around the water supply passage 46, the discharge passage 48 and the hydrogen passage 50, respectively. First seal members 62b, 62c, 62d are disposed in the first seal grooves 64b, 64c, 64d, respectively. The first seal members 62a through 62d are, for example, o-rings.

The surface 36a of the cathode separator 36 which faces the membrane electrode assembly 32 has a second seal groove 68a defined therein which extends annularly around the second flow field 58 and the cathode current collector 42. A second seal member 66a is disposed in the second seal groove 68a.

As shown in FIGS. 3 and 4, the surface 36a of the cathode separator 36 also has second seal grooves 68b, 68c and 68d defined therein which extend annularly around the water supply passage 46, the discharge passage 48 and the hydrogen passage 50, respectively. Second seal members 66b, 66c and 66d, each in the form of an O-ring, for example, are disposed respectively in the second seal grooves 68b, 68c and 68d.

The unit cell 12 has a pressure-releasing chamber 72 disposed outwardly of the first seal groove 64a. The pressure-releasing chamber 72 is capable of communicating with the first seal groove 64a, and communicates with the outside through a predetermined number of depressurizing channels 70 formed in the cathode separator 36.

The pressure-releasing chamber 72 annularly extends around the first seal groove 64a over the entire circumference. The pressure-releasing chamber 72 has a recess 74 facing the depressurizing channel 70 across the solid polymer electrolyte membrane 38. The recess 74 is formed in the anode separator 34. The size of the recess 74 is set such that the solid polymer electrolyte membrane 38 is pressed into the recess 74 under pressure of the generated hydrogen (e.g., 35 MPa) thereby to form a cavity on the depressurizing channel 70 side.

The unit cell 12 also has a pressure-releasing chamber 78 disposed outwardly of the first seal groove 64d annularly extending around the hydrogen passage 50. The pressure-releasing chamber 78 is capable of communicating with the first seal groove 64d, and communicates with the outside through a predetermined number of depressurizing channels 76 formed in the anode separator 34 and the cathode separator 36. The pressure-releasing chamber 78 annularly extends around the first seal groove 64d and the second seal groove 68d over the entire circumference, and has a recess 80 communicating with the depressurizing channels 76.

As shown in FIGS. 1 and 2, pipes 82a, 82b, 82c are connected to the end plate 20a in fluid communication with the water supply passage 46, the discharge passage 48, and the hydrogen passage 50, respectively. A back pressure valve or a solenoid-operated valve, not shown, is connected to the pipe 82c for maintaining the pressure of hydrogen generated in the hydrogen passages 50 at a high pressure level.

Operation of the water electrolysis apparatus 10 will be described below.

As shown in FIG. 1, water is supplied from the pipe 82a to the water supply passage 46 in the water electrolysis apparatus 10, and a voltage is applied between the terminals 24a, 24b of the terminal plates 16a, 16b by the power supply 28. As shown in FIG. 3, in each of the unit cells 12, the water is supplied from the water supply passage 46 into the first flow field 54 of the anode separator 34 and moves along the anode current collector 40.

The water is electrolyzed by the anode catalyst layer 40a, generating hydrogen ions, electrons, and oxygen. The hydrogen ions generated by the anodic reaction move through the solid polymer electrolyte membrane 38 to the cathode catalyst layer 42a where they combine with the electrons to produce hydrogen.

The produced hydrogen flows along the second flow field 58 that is defined between the cathode separator 36 and the cathode current collector 42. The hydrogen is kept under a pressure higher than the pressure in the water supply passage 46, and flows through the hydrogen passage 50. Thus, the hydrogen is extracted from the water electrolysis apparatus 10. The oxygen generated by the anodic reaction and the water that has been used flow in the first flow field 54 and then flow through the discharge passage 48 for being discharged from the water electrolysis apparatus 10.

Figure 5:
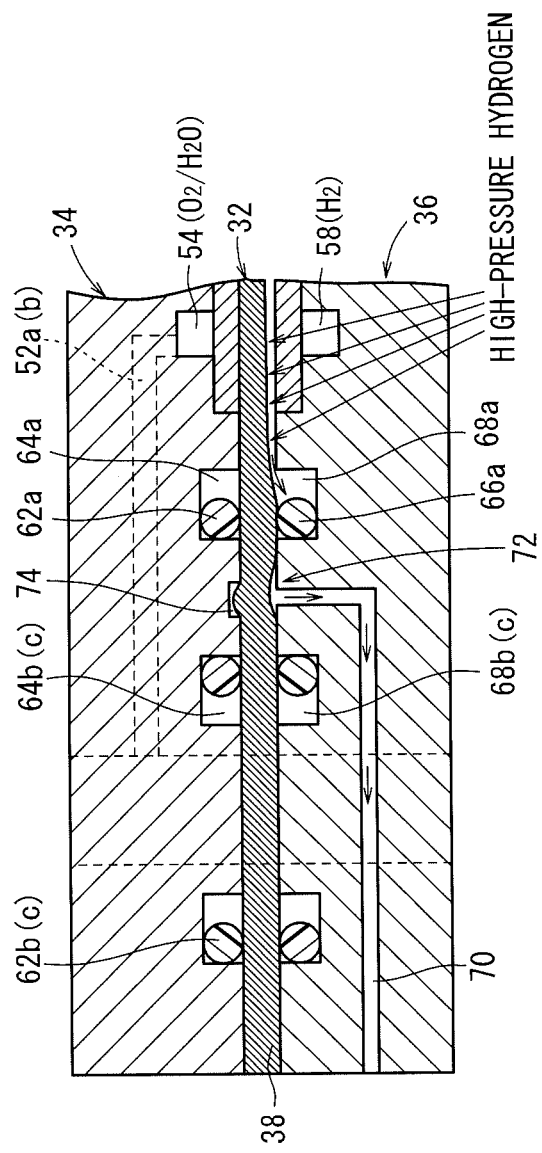
FIG. 5 is an explanatory view of a pressure-releasing chamber of the unit cell.

As described above, in the second flow field 58, high-pressure hydrogen is generated. Accordingly, the second flow field 58 serves as a high-pressure hydrogen generating chamber. The second flow field 58 communicates with the second seal groove 68a through a surface of the solid polymer electrolyte membrane 38, and the second seal groove 68a is filled with high-pressure hydrogen. Thus, as shown in FIG. 5, high-pressure hydrogen tends to leak through a gap between the second seal member 66a in the second seal groove 68a and the solid polymer electrolyte membrane 38.

In this case, according to the first embodiment, the pressure-releasing chamber 72 is disposed outwardly of the second seal groove 68a. The pressure-releasing chamber 72 is capable of communicating with the second seal groove 68a, and communicates with the outside through the depressurizing channels 70. The high-pressure hydrogen leaking from the second seal member 66a presses and deforms the solid polymer electrolyte membrane 38 toward the recess 74, and then flows into the pressure-releasing chamber 72. The high-pressure hydrogen flows around the second seal groove 68a along the recess 74, and is then discharged to the outside of the unit cell 12 through the depressurizing channels 70.

With the above structure, even when high-pressure hydrogen flows into the second seal groove 68a from the second flow field 58 serving as the high-pressure hydrogen generating chamber and leaks to the outside of the second seal groove 68a, the high-pressure hydrogen can be prevented from stagnating in the unit cell 12.

Accordingly, a balance of pressing forces applied to the entire water electrolysis apparatus 10 in the stacking direction through tie-rods 22, etc. is not disrupted, so that desired pressing forces can be stably applied to the solid polymer electrolyte membranes 38. As a result, in the water electrolysis apparatus 10, electrolysis voltage is prevented from increasing, and thus a desired electrolysis performance can be suitably maintained for a long period of time.

According to the first embodiment, the pressure-releasing chamber 72 extends annularly around the second seal member 66a over the entire circumference. With the structure, high-pressure hydrogen can be suitably collected in the pressure-releasing chamber 72, and thus the number of the depressurizing channels 70 can be reduced effectively.

Further, the pressure-releasing chamber 72 has the recess 74 formed in the anode separator 34. Since the recess 74 is formed in the anode separator 34 which is under low pressure, it is not necessary to reinforce the anode separator 34. In contrast, if the recess is formed in the cathode separator 36 which is under high pressure, the strength of the cathode separator 36 decreases, and thus it is necessary to reinforce the cathode separator 36 in order to compensate for the decrease in the strength.

Further, according to the first embodiment, high-pressure hydrogen flows into the hydrogen passage 50 communicating with the second flow field 58, so that the hydrogen passage 50 serves as a high-pressure chamber. The first and second seal grooves 64d, 68d communicate with the hydrogen passage 50, and thus also serve as high-pressure chambers, respectively.

Accordingly, high-pressure hydrogen leaking from the first seal groove 64d and the second seal groove 68d flow into the pressure-releasing chamber 78 disposed outwardly of the first seal groove 64d and the second seal groove 68d. The high-pressure hydrogen that has flowed into the pressure-releasing chamber 78 is discharged to the outside through the depressurizing channels 76.

With the structure, the high-pressure hydrogen leaking through the first seal member 62d and the second seal member 66d does not stagnate in the unit cell 12, and thus it is possible to obtain the above-mentioned effects that desired pressing forces can be stably applied to the solid polymer electrolyte membranes 38, etc.

Figure 6:
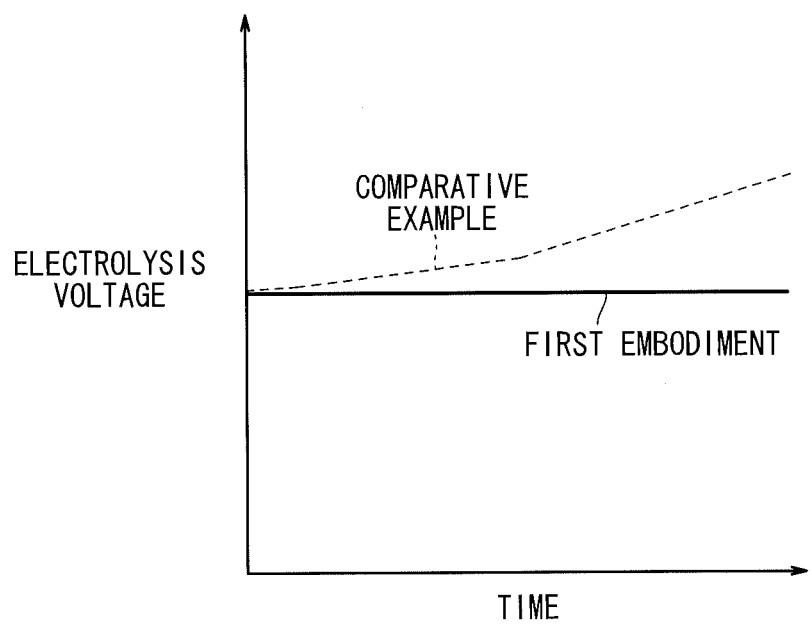
FIG. 6 is a graph showing relationships between water electrolysis process time and requisite electrolysis voltage in the first embodiment and in a comparative example.

FIG. 6 is a graph showing relationships between time and requisite electrolysis voltage when water electrolysis process is performed in the first embodiment and in a comparative example in which the pressure-releasing chambers 72, 78 are not provided. In the comparative example, high-pressure hydrogen stagnated in the unit cell 12, and thus a balance of pressing forces applied in the stacking direction was disrupted and the electrolysis voltage required for electrolysis increased with time. In the comparative example, the electrolysis performance decreased with time.

In contrast, in the first embodiment, high-pressure hydrogen did not stagnate in the unit cell 12, so that the electrolysis voltage was prevented from increasing. Thus, a desired electrolysis performance can be maintained for a long period of time.

Figure 7:
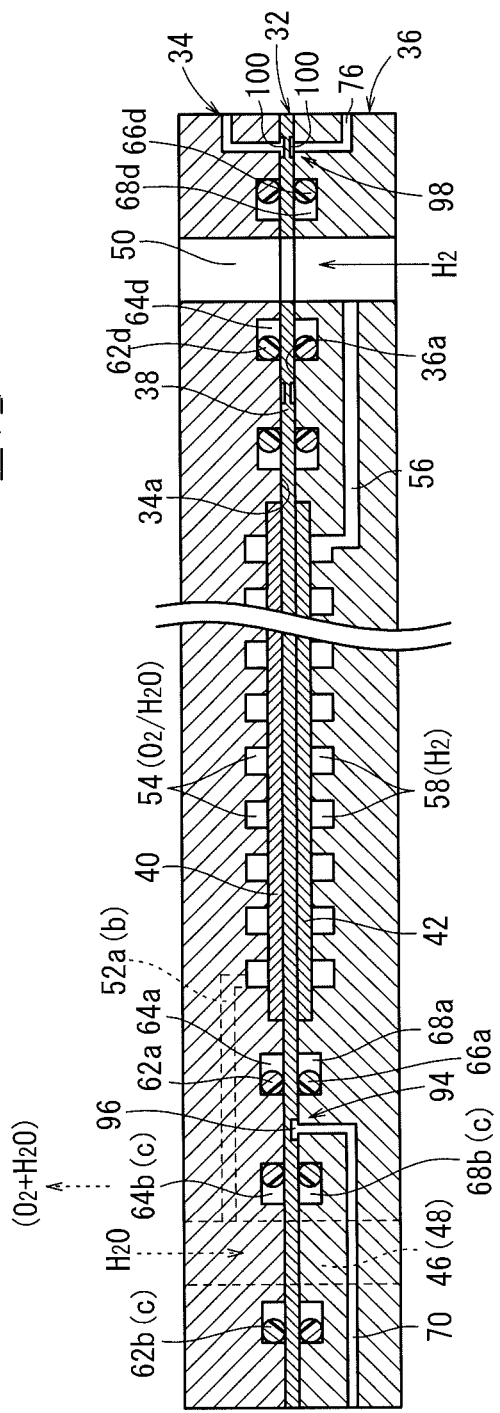
FIG. 7 is a fragmentary cross-sectional view of a unit cell of a water electrolysis apparatus according to a second embodiment of the present invention.

FIG. 7 is a fragmentary cross-sectional view of a unit cell 92 of a water electrolysis apparatus 90 according to a second embodiment of the present invention.

Those parts of the unit cell 92 which are identical to those of the unit cell 12 of the water electrolysis apparatus 10 according to the first embodiment are denoted by identical reference characters and will not be described below. Also in third and other following embodiments, the explanations are omitted in the same manner.

The unit cell 92 has a pressure-releasing chamber 94 disposed outwardly of the second seal groove 68a. The pressure-releasing chamber 94 is capable of communicating with the second seal groove 68a, and communicates with the outside through depressurizing channels 70. The pressure-releasing chamber 94 has a recess 96 formed in the solid polymer electrolyte membrane 38. The recess 96 annularly extends around the second seal groove 68a over the entire circumference.

The unit cell 92 further has pressure-releasing chambers 98 disposed outwardly of the first seal groove 64d and the second seal groove 68d which extend annularly around the hydrogen passage 50. The pressure-releasing chambers 98 communicate with the outside through depressurizing channels 76. The pressure-releasing chambers 98 have recesses 100 formed respectively in both surfaces of the solid polymer electrolyte membrane 38.

In the second embodiment, the pressure-releasing chambers 94, 98 have recesses 96, 100 formed in the solid polymer electrolyte membrane 38, respectively. Accordingly, it is not necessary to form the recesses in the anode separator 34 and the cathode separator 36. Thus, the structure thereof is further simplified, and it is possible to obtain the same effects as the first embodiment, such that desired pressing forces can be stably applied to the solid polymer electrolyte membranes 38, etc.

Figure 8:
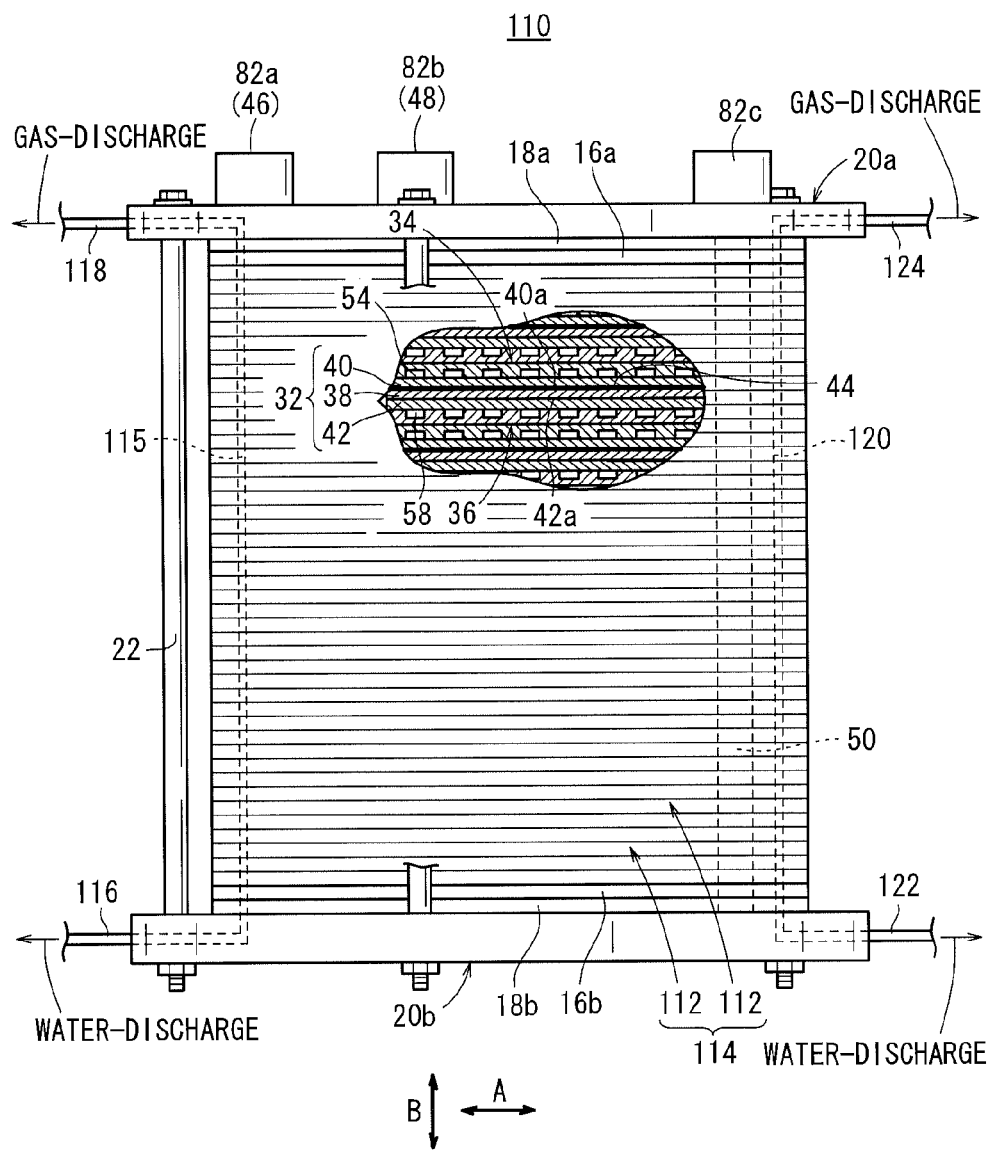
FIG. 8 is a side elevational view, partly in cross section, of a water electrolysis apparatus according to a third embodiment of the present invention.

FIG. 8 is a side elevational view, partly in cross section, of a water electrolysis apparatus 110 according to a third embodiment.

Figure 9:
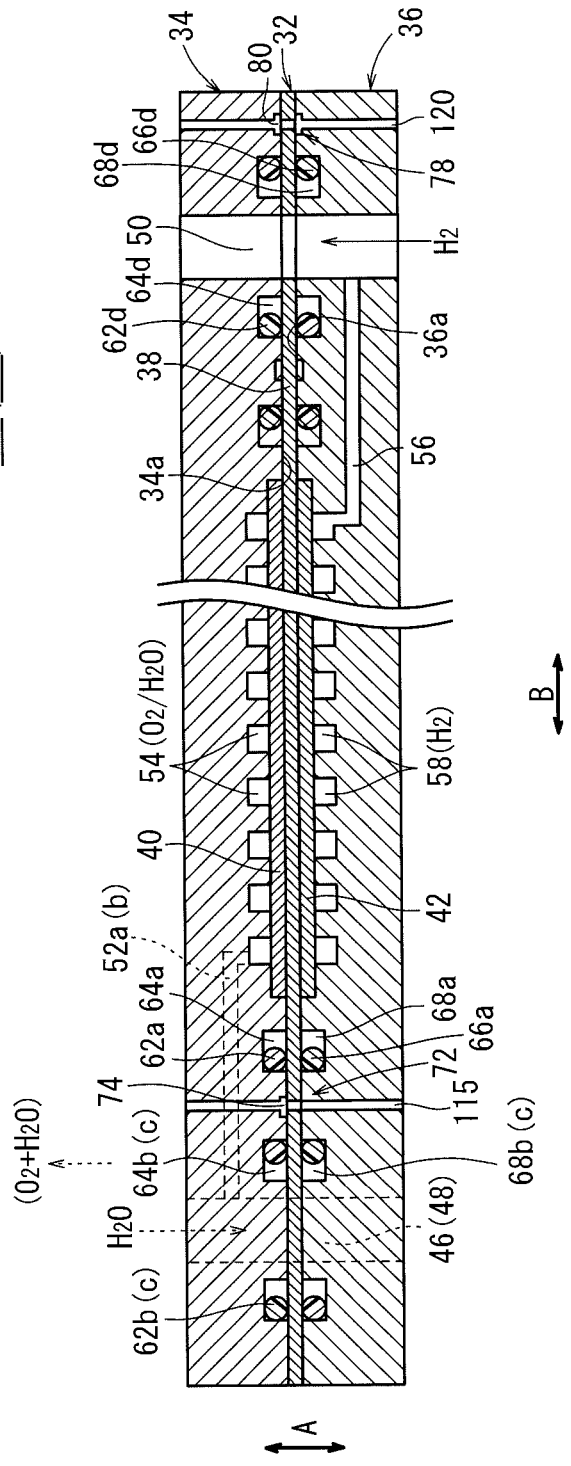
FIG. 9 is a fragmentary cross-sectional view of a unit cell of the water electrolysis apparatus shown in FIG. 8.

The water electrolysis apparatus 110 has a stack 114 of a plurality of unit cells 112 stacked in a vertical direction (indicated by arrow B). As shown in FIG. 9, the unit cell 112 has a depressurizing channel 115 communicating with the pressure-releasing chamber 72. The depressurizing channel 115 forms a passage hole extending through the anode separator 34, the solid polymer electrolyte membrane 38 and the cathode separator 36 in the stacking direction.

As shown in FIG. 8, an end plate 20b is disposed on a lower end portion (one end portion) of the stack 114 in the stacking direction. The end plate 20b has a water-discharge passageway 116 communicating with one end of the depressurizing channel 115 and which extends to the outside of the stack 114. Also, an end plate 20a is disposed on an upper end portion (the other end portion) of the stack 114 in the stacking direction. The end plate 20a has a gas-discharge passageway 118 communicating with the other end of the depressurizing channel 115 and which extends to the outside of the stack 114.

As shown in FIG. 9, the unit cell 112 has a depressurizing channel 120 communicating with the pressure-releasing chamber 78. The depressurizing channel 120 extends through the anode separator 34, the solid polymer electrolyte membrane 38 and the cathode separator 36 in the stacking direction.

The depressurizing channel 120 forms a passage hole. The depressurizing channel 120 has a lower end portion (one end portion) communicating with a water-discharge passageway 122 formed in the end plate 20b, and an upper end portion (the other end portion) communicating with a gas-discharge passageway 124 formed in the end plate 20a. The water-discharge passageway 122 and the gas-discharge passageway 124 extend from a side portion of the stack 114 to the outside thereof.

According to the third embodiment, the pressure-releasing chamber 72 and the depressurizing channel 115 are disposed outwardly of the second seal groove 68a. The pressure-releasing chamber 72 is capable of communicating with the second seal groove 68a, and the depressurizing channel 115 penetrates in the stacking direction (indicated by arrow A).

The second flow field 58 is filled with high-pressure hydrogen and permeated water, and the hydrogen and the water flow into the pressure-releasing chamber 72. The hydrogen flows upwardly along the depressurizing channel 115 and is then discharged through the gas-discharge passageway 118 of the end plate 20a. On the other hand, the water flows downwardly along the depressurizing channel 115, and is then discharged through the water-discharge passageway 116 of the end plate 20b.

Thus, according to the third embodiment, it is also possible to obtain the same effects as the first embodiment that high-pressure hydrogen leaking to the outside of the second seal groove 68a can be prevented from stagnating in the unit cell 112, etc. Further, liquid junction can be advantageously prevented from occurring due to leakage of water to the outside of the second seal groove 68a as far as possible.

According to the third embodiment, high-pressure hydrogen and permeated water that have leaked from the first and second seal grooves 64d, 68d flow into the pressure-releasing chamber 78. The hydrogen flows upwardly along the depressurizing channel 120, and the permeated water flows downwardly along the depressurizing channel 120. Accordingly, the leaked hydrogen is reliably discharged through the gas-discharge passageway 124, while the leaked water is suitably discharged through the water-discharge passageway 122, and thus the same effects as above can be obtained.

Figure 10:
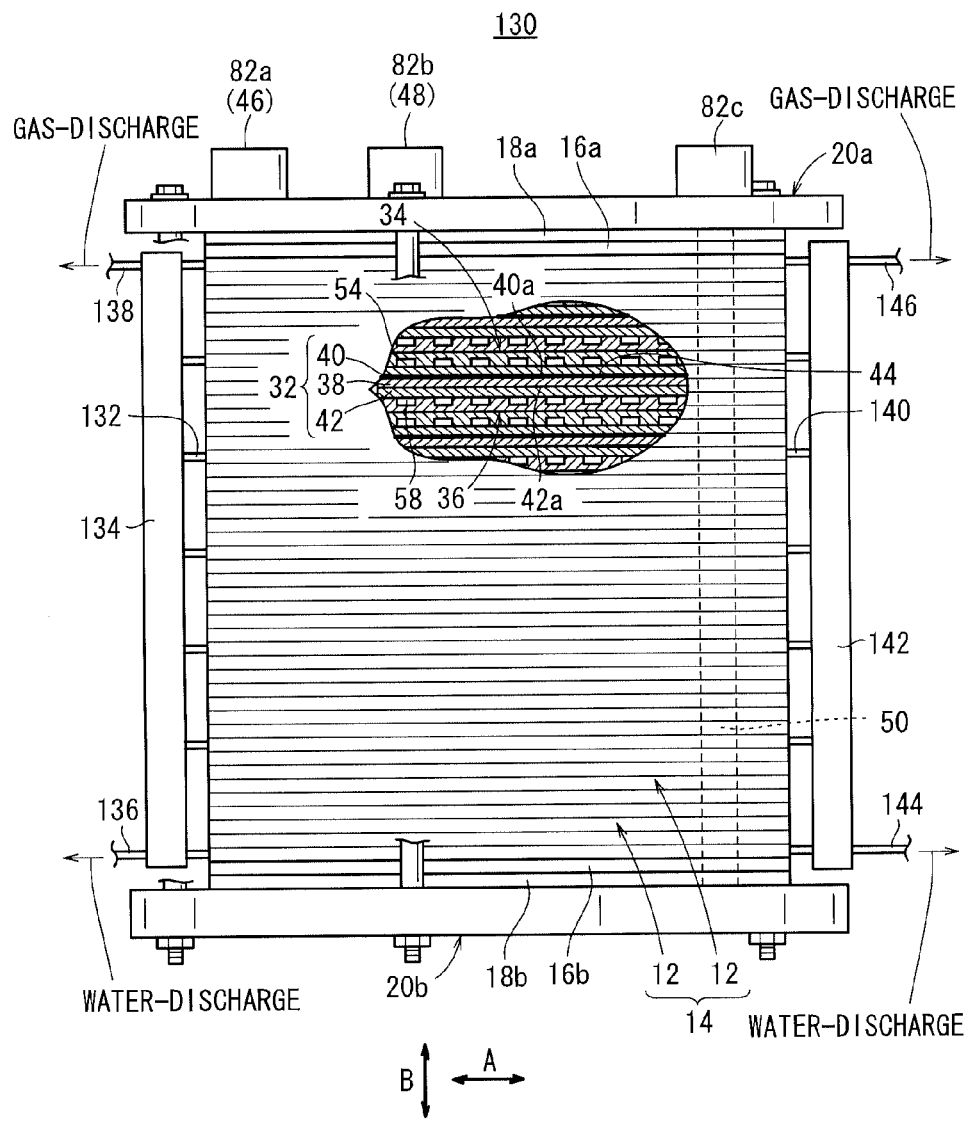
FIG. 10 is a side elevational view, partly in cross section, of a water electrolysis apparatus according to a fourth embodiment of the present invention.

FIG. 10 is a side elevational view, partly in cross section, of a water electrolysis apparatus 130 according to a fourth embodiment of the present invention.

Figure 11:
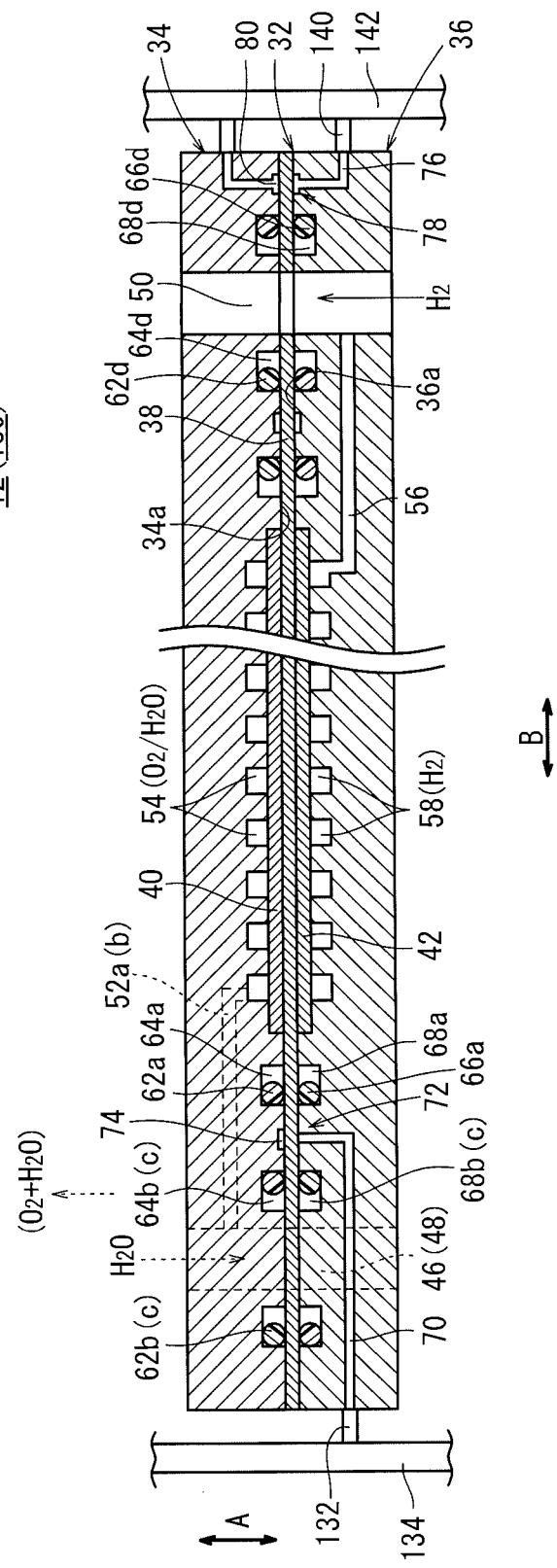
FIG. 11 is a fragmentary cross-sectional view of a unit cell of the water electrolysis apparatus shown in FIG. 10.

The water electrolysis apparatus 130 has a stack 14 of a plurality of unit cells 12. As shown in FIG. 11, insulating connectors 132 are disposed outside the water electrolysis apparatus 130, the insulating connectors 132 communicating with the depressurizing channels 70. Outside the stack 14, there is provided a pipe member 134. The pipe member 134 extends in the stacking direction of the anode separator 34, the solid polymer electrolyte membrane 38 and the cathode separator 36, and is connected to the insulating connectors 132 (see FIG. 10). The pipe member 134 has a lower end portion (one end portion) communicating with a water-discharge passageway 136, and an upper end portion (the other end portion) communicating with a gas-discharge passageway 138.

As shown in FIG. 11, outside the unit cell 12, there are provided connectors 140 communicating with the depressurizing channels 76. The connectors 140 are connected to a pipe member 142 extending in the stacking direction (indicated by arrow B). As shown in FIG. 10, the pipe member 142 has a lower end portion (one end portion) connected to a water-discharge passageway 144, and an upper end portion (the other end portion) connected to a gas-discharge passageway 146.

According to the fourth embodiment, as with the third embodiment, hydrogen and water do not unnecessarily leak to the outside of the stack 14, and a desired electrolysis performance can be suitably maintained for a long period of time.

Figure 12:
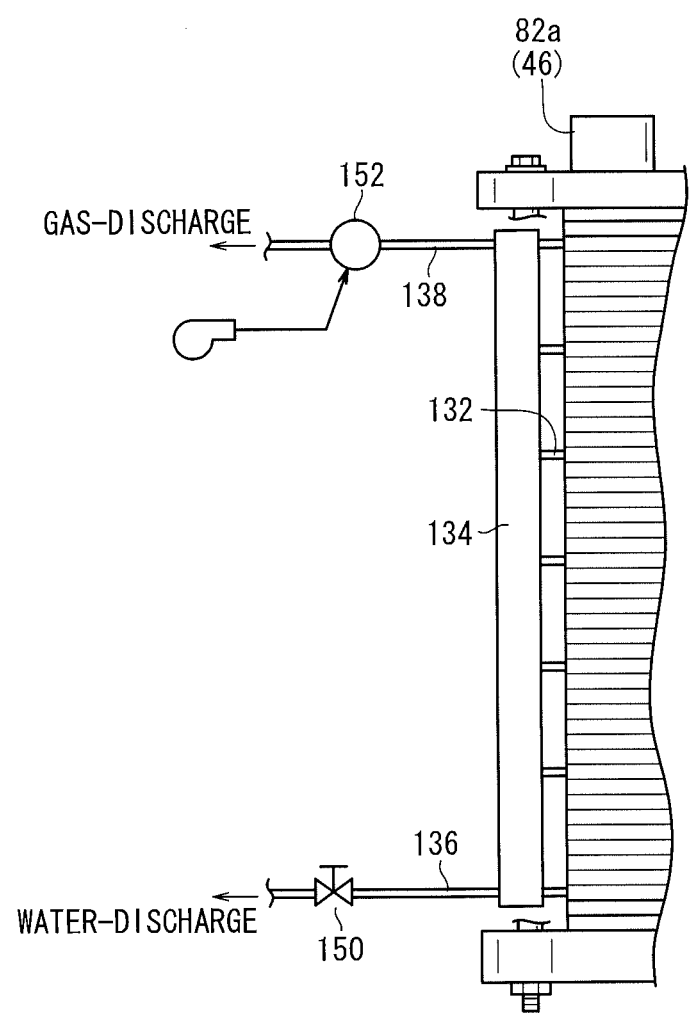
FIG. 12 is a schematic explanatory view of a water-discharge process and a gas-discharge process.
Figure 13:
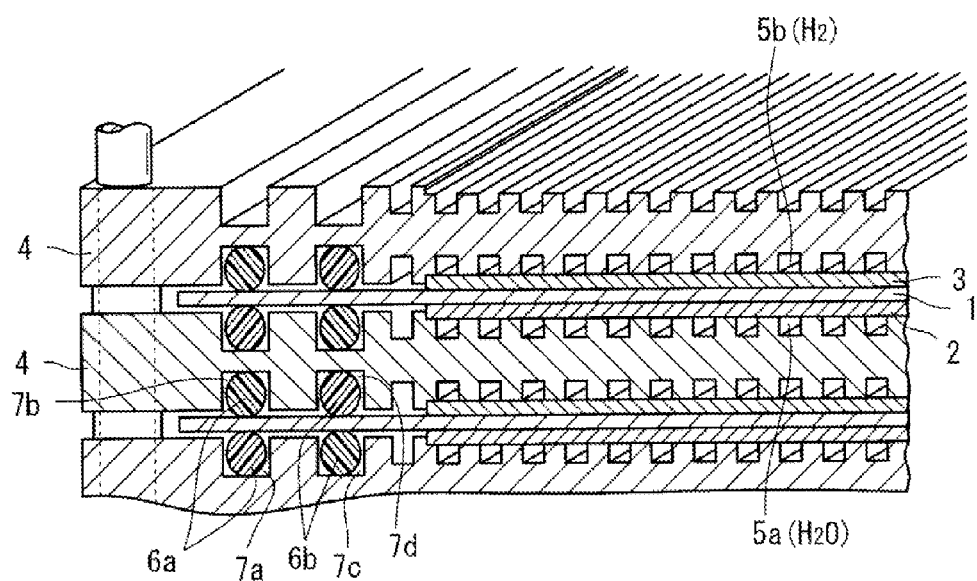
FIG. 13 is an explanatory view of a water electrolysis apparatus disclosed in Japanese Laid-Open Patent Publication No. 2004-002914.

In order to discharge water and gas, for example, a structure shown in FIG. 12 may be applied to the third and fourth embodiments. The application of such a structure to the fourth embodiment will be explained below, and the structure can be similarly applied to the third embodiment.

There is provided a valve 150 on the water-discharge passageway 136 of the pipe member 134. The valve 150 is manually or automatically operated to open and close for a drain process. There is provided, for example, a dilution unit 152 on a gas-discharge passageway 138 of the pipe member 134. Air is introduced into the dilution unit 152 to dilute leaked hydrogen with the introduce air.

Although certain preferred embodiments of the present invention have been shown and described in detail, it should be understood that various changes and modifications may be made therein without departing from the scope of the appended claims.

What is claimed is:

1. A water electrolysis apparatus for producing hydrogen through electrolysis of water, the apparatus comprising:
   an electrolyte membrane;
   first and second current collectors disposed respectively on opposite sides of the electrolyte membrane;
   first and second separators stacked respectively on the current collectors;
   a first flow field defined by stacking the first current collector and the first separator; and
   a second flow field defined by stacking the second current collector and the second separator,
   wherein at least the first separator or the second separator has a seal groove annularly extending around the first current collector or the second current collector, a seal member being disposed in the seal groove, and
   a pressure-releasing chamber is disposed outwardly of the seal groove, is capable of communicating with the seal groove, and communicates with an outside through a depressurizing channel,
   wherein the electrolyte membrane extends through the pressure-releasing chamber, and
   the pressure-releasing chamber has a recess, the recess either facing the depressurizing channel across the electrolyte membrane or is formed in the electrolyte membrane.

2. The water electrolysis apparatus according to claim 1, wherein the pressure-releasing chamber annularly extends around the seal groove over an entire circumference thereof.

3. The water electrolysis apparatus according to claim 1, wherein the electrolyte membrane is sandwiched between the first separator and the second separator, and
   the pressure-releasing chamber is formed in the first separator or the second separator.

4. The water electrolysis apparatus according to claim 1, wherein the electrolyte membrane is sandwiched between the first separator and the second separator.

5. The water electrolysis apparatus according to claim 1, wherein the depressurizing channel has a passage hole extending through the first separator, the electrolyte membrane and the second separator in a stacking direction thereof, and
   the passage hole has one end portion communicating with a water-discharge passageway and another end portion communicating with a gas-discharge passageway.

6. The water electrolysis apparatus according to claim 1, further comprising:
   a plurality of insulating connectors disposed outside the water electrolysis apparatus, the connectors communicating with the depressurizing channels; and a pipe member which is disposed outside the water electrolysis apparatus and which extends in a stacking direction of the first separator, the electrolyte membrane and the second separator, the pipe member being connected to the insulating connectors, wherein the pipe member has one end portion communicating with a water-discharge passageway and another end portion communicating with a gas-discharge passageway.

7. The water electrolysis apparatus according to claim 1, wherein the first flow field is a water flow field to which water is supplied, the second flow field is a hydrogen flow field for producing hydrogen having pressure higher than normal pressure, through electrolysis of the water, and the second flow field is capable of communicating with the seal groove.

8. A water electrolysis apparatus for producing hydrogen through electrolysis of water, the apparatus comprising:

an electrolyte membrane;

first and second current collectors disposed respectively on opposite sides of the electrolyte membrane;

first and second separators stacked respectively on the current collectors;

a first flow field defined by stacking the first current collector and the first separator; and a second flow field defined by stacking the second current collector and the second separator; and a passage communicating with at least the first flow field or the second flow field and which extends in a stacking direction of the first and second separators, wherein at least the first separator or the second separator has a seal groove annularly extending around the passage, a seal member being disposed in the seal groove, and a pressure-releasing chamber is disposed outwardly of the seal groove, is capable of communicating with the seal groove, and communicates with an outside through a depressurizing channel, wherein the electrolyte membrane extends through the pressure-releasing chamber, and the pressure-releasing chamber has a recess, the recess either facing the depressurizing channel across the electrolyte membrane or is formed in the electrolyte membrane.

9. The water electrolysis apparatus according to claim 8, wherein the pressure-releasing chamber annularly extends around the seal groove over an entire circumference thereof.

10. The water electrolysis apparatus according to claim 8, wherein the electrolyte membrane is sandwiched between the first separator and the second separator, and the pressure-releasing chamber is formed in the first separator or the second separator.

11. The water electrolysis apparatus according to claim 8, wherein the electrolyte membrane is sandwiched between the first separator and the second separator.

12. The water electrolysis apparatus according to claim 8, wherein the depressurizing channel has a passage hole extending through the first separator, the electrolyte membrane and the second separator in a stacking direction thereof, and the passage hole has one end portion communicating with a water-discharge passageway and another end portion communicating with a gas-discharge passageway.

13. The water electrolysis apparatus according to claim 8, further comprising:

a plurality of insulating connectors disposed outside the water electrolysis apparatus, the connectors communicating with the depressurizing channels; and a pipe member which is disposed outside the water electrolysis apparatus and which extends in a stacking direction of the first separator, the electrolyte membrane and the second separator, the pipe member being connected to the insulating connectors, wherein the pipe member has one end portion communicating with a water-discharge passageway and another end portion communicating with a gas-discharge passageway.

14. The water electrolysis apparatus according to claim 8, wherein the first flow field is a water flow field to which water is supplied, the second flow field is a hydrogen flow field for producing hydrogen having pressure higher than normal pressure, through electrolysis of the water, and the second flow field is capable of communicating with the seal groove through the passage.

* * * * *